Jan. 9, 1940.    F. R. WEYMOUTH    2,186,221
WING SLOT
Filed Feb. 10, 1938
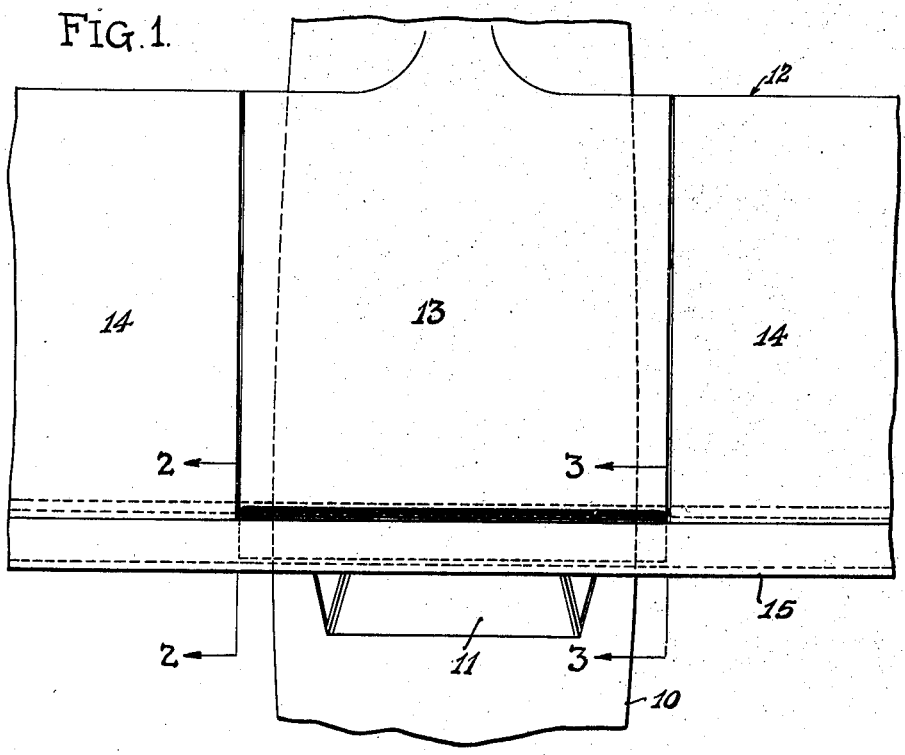
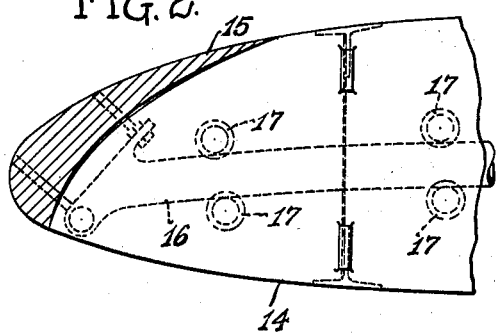
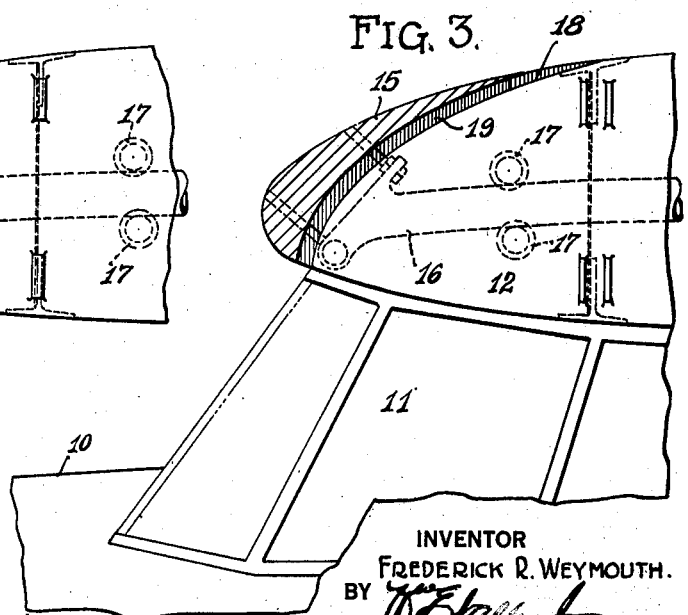
INVENTOR
FREDERICK R. WEYMOUTH.
BY
ATTORNEY Patented Jan. 9, 1940

2,186,221

UNITED STATES PATENT OFFICE 2,186,221

WING SLOT

Frederick R. Weymouth, Buffalo, N. Y., assignor to Curtiss-Wright Corporation, a corporation of Delaware Application February 10, 1938, Serial No. 189,754

12 Claims. (Cl. 244—42)

This invention relates to aircraft and is concerned particularly with the provision of means for improving airflow with respect to a wing and a cabin or body associated therewith.

An object of the invention is to improve the airflow characteristics over the upper surface of a wing which is closely associated with a cabin or body therebeneath and accordingly, the invention is particularly adapted for use on "high wing" aircraft.

Movable, slot-forming, auxiliary leading edge airfoils are well-known in the art, these devices being applicable to the leading edge of aircraft wings for the purpose of increasing the angle of attack of a wing before stalling occurs. Such auxiliary airfoils may be either automatic or manually selective in operation, automatic operation being responsive to the shift in the point where pressure changes from positive to negative at the wing leading edge according to the angle of attack.

If an aircraft be of the type wherein a wing is superimposed upon a body or cabin structure, said structure obviously prevents airflow upon the under surface of the wing, diverting attacking air in that portion of the wing span occupied by the structure over the upper wing surface. Thus, the airflow characteristics over the upper wing surface are quite different in that portion of the span occupied by the structure from the other span portions which are clear of obstruction. It has been found beneficial to provide an auxiliary airfoil at the leading edge of the center section of the wing (that portion co-extensive with the cabin structure), said airfoil being adjusted to form a slot with the center section leading edge at all times to control airflow over the upper surface of the center section. When this type of airplane utilizes auxiliary airfoils co-extensive with the wing span, it is desirable to make the flap actually co-extensive and in one piece. Thus the flap bridges not only the unobstructed wing but the center section as well, and it is essential for proper maneuvering that the airfoil be movable to slot-forming and non-slot-forming positions so far as the unobstructed wing is concerned. This invention provides particularly a recessed center section leading edge in connection with a slot forming auxiliary airfoil, so arranged that there is a narrow slot at the center section while there is no slot on the unobstructed wing portions, and so that there is a wide slot at the center section while there is a normal slot formed on the unobstructed wing portion.

A particular mechanical arrangement of the invention is shown in the drawing in which:

Fig. 1 is a plan of a portion of an aircraft body and wing assembly;

Fig. 2 is a section on the line 2—2 of Fig. 1, and

Fig. 3 is a section on the line 3—3 of Fig. 1.

An aircraft fuselage is indicated at 10 and projecting upwardly therefrom is a cabin 11 along the upper part of which is mounted a wing 12, the wing comprising a center section 13 to which the outer wing panels 14 are attached. It will be apparent that the cabin 11 interrupts airflow over the lower surface of the center section, whereas, the upper surface of the center section is co-extensive with the upper surfaces of the panels 14. Along the leading edge of the wing structure 12 is an auxiliary leading edge flap 15 mounted on members 16 which extend within the wing and which are supported on rollers 17 to permit of forward and rearward movement of the airfoil. The leading edge of the center section 13 is recessed along its span as indicated at 18 to provide, with the airfoil 15, a leading edge slot 19 extending upwardly and rearwardly from the lower portion of the leading edge to an upper rearward portion thereof. Due to the recess 18, the slot 19 is always formed at the center section although the airfoil 15 may rest tightly against the leading edge of the panels 14, as shown in Fig. 2. If the airfoil 15 be moved forwardly, as when high angle of attack conditions are encountered, the leading edge slot will be formed along the whole wing span, the center section slot 19 merely widening to permit of a greater amount of airflow therethrough. When the airfoil 15 is nested as shown in the figures, the slit 19 assists in controlling airflow over the upper surface of the center section 13 and in augmenting the lift thereof without unduly affecting the speed characteristics of the aircraft as a whole.

If desirable, the airfoil 15 may be several units, one for the center section and one or more for each panel 14.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In aircraft having a wing, a body structure below and contiguous to the wing and occupying a portion of the wing span, a movable auxiliary airfoil co-extensive with the wing leading edge and movable relative thereto to open and close a slot between the wing leading edge and the airfoil, said leading edge being recessed above said body structure so as to provide a slot thereat whether the slot on the balance of the wing leading edge is open or closed.

2. In aircraft a center section wing portion, a body below and contiguous with said portion, outboard wing portions on each side of said portion forming substantial lateral continuations thereof but having their leading edges forwardly located relative to the leading edge of said center section portion, and a substantially straight auxiliary slot-forming airfoil movably disposed along the wing portion leading edges, to open and close a slot with respect to said outboard wing portions and to change the area of the slot, of said center section wing portion, by virtue of the rearwardly displaced leading edge thereof.

3. An aircraft wing assembly comprising wing portions having unalined leading edges, and an alined auxiliary airfoil co-extensive with the total span of said wing portions and movable toward and from the leading edges of said wing portions.

4. In an aircraft wing assembly, a wing having a portion of its leading edge stepped rearwardly from the leading edge of the balance of the wing, and a contiguous leading edge auxiliary airfoil movable away from the wing to provide therebeneath a slot, said airfoil being movable toward the wing to close the slot on said balance of the wing but leaving a slot at and due to said rearwardly stepped leading edge portion.

5. In an aircraft wing assembly, a wing having a portion of its leading edge stepped rearwardly from the leading edge of the balance of the wing, a contiguous leading edge auxiliary airfoil movable away from the wing to provide therebeneath a slot, said airfoil being movable toward the wing to close the slot on said balance of the wing but leaving a slot at and due to said rearwardly stepped leading edge portion, and a body portion attached beneath the wing at that portion in its span whereat the leading edge is rearwardly stepped.

6. In a composite wing structure, a center wing section, outer wing panels attached thereto having their leading edges in advance of the leading edge of said center wing section, and a movable slot forming leading edge auxiliary air foil extending substantially straight across the span of the wing structure, said airfoil being adjustable to a position wherein a slot is formed between itself and the leading edge of said center wing section while no slot is formed between itself and the outer wing panel leading edges.

7. In a composite wing structure, a center wing section, outer wing panels attached thereto having their leading edges in advance of the leading edge of said center wing section, and a movable slot forming leading edge auxiliary airfoil extending substantially straight across the span of the wing structure, said airfoil being adjustable to a position wherein a slot is formed between itself and the leading edge of said center wing section while no slot is formed between itself and the outer wing panel leading edges, and a body structure attached to and beneath the center wing section.

8. In aircraft, a body structure having the top thereof formed as a wing section, means providing at the leading edge of said section a slot extending from the bottom to the top of the leading edge, and unslotted wing panels extending laterally from said body whose upper surfaces are substantially continuations of the top wing surface of said body.

9. In aircraft, in combination, a wing having a through slot from the lower to the upper surface adjacent the leading edge thereof, said slot extending transversely across the central part only of the span of the wing.

10. In aircraft, in combination, a wing having a through slot from the lower to the upper surface adjacent the leading edge thereof, said slot extending across part only of the span of the wing, and a body adjacent to and beneath that part of the wing span which is substantially co-extensive with the length of said slot.

11. In aircraft, in combination, a body, a wing thereabove, extending in span laterally beyond the body, and means forming a through slot in that central portion only of the wing leading edge which is substantially coextensive in span with the width of said body.

12. In aircraft, in combination, a body, a wing thereabove, extending in span laterally beyond the body, means forming a through slot in that portion only of the wing leading edge which is substantially coextensive in span with the width of said body, and additional means operable to open and close a slot at the wing leading edge throughout the remainder of the wing span.

FREDERICK R. WEYMOUTH.